(12) United States Patent
Balsiger

(10) Patent No.: US 9,394,984 B2
(45) Date of Patent: Jul. 19, 2016

(54) THREE POINT HARMONIC DRIVE

(71) Applicant: Hamilton Sundstrand Corporation, Windsor Locks, CT (US)

(72) Inventor: Derick Balsiger, Mayer, AZ (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 74 days.

(21) Appl. No.: 14/299,624

(22) Filed: Jun. 9, 2014

(65) Prior Publication Data
US 2015/0354686 A1 Dec. 10, 2015

(51) Int. Cl.
*F16H 37/02* (2006.01)
*F16H 49/00* (2006.01)

(52) U.S. Cl.
CPC ........ *F16H 49/001* (2013.01); *F16H 2049/003* (2013.01); *Y10T 74/19* (2015.01)

(58) Field of Classification Search
CPC .................................................. F16H 49/001
USPC .......................................................... 74/640
See application file for complete search history.

(56) References Cited

U.S. PATENT DOCUMENTS

| | | | |
|---|---|---|---|
| 4,825,720 A * | 5/1989 | Capdepuy | F16H 49/001 74/468 |
| 5,775,178 A | 7/1998 | Asawa et al. | |
| 5,850,765 A | 12/1998 | Shirasawa | |
| 5,906,142 A | 5/1999 | Shirasawa | |
| 6,026,711 A | 2/2000 | Tortora et al. | |
| 6,082,222 A | 7/2000 | Kiyosawa et al. | |
| 6,302,073 B1 * | 10/2001 | Heer | F01L 1/34 123/90.15 |
| 6,439,081 B1 | 8/2002 | Duff | |
| 6,454,532 B1 | 9/2002 | Gmirya | |
| 6,564,677 B1 | 5/2003 | Kiyosawa et al. | |
| 6,672,181 B2 * | 1/2004 | Kobayashi | F16H 49/001 74/640 |
| 6,805,025 B2 | 10/2004 | Ruttor | |
| 6,893,371 B2 * | 5/2005 | Mills | F16H 63/18 475/149 |
| 7,178,427 B2 | 2/2007 | Christensen | |
| 7,213,487 B2 | 5/2007 | Tanioka et al. | |
| 7,770,688 B2 * | 8/2010 | Kenez | B62D 5/008 180/443 |
| 7,958,801 B2 | 6/2011 | Frederickson | |
| 8,382,629 B2 | 2/2013 | Hirata | |
| 8,485,064 B2 | 7/2013 | Kanai | |
| 8,646,360 B2 | 2/2014 | Kanai | |
| 8,852,048 B2 * | 10/2014 | Shelef | F16H 49/001 475/331 |
| 2003/0080246 A1 * | 5/2003 | Koizumi | B64C 9/02 244/99.3 |
| 2011/0245006 A1 * | 10/2011 | Negishi | B25J 9/1025 475/149 |
| 2012/0085188 A1 * | 4/2012 | Kurogi | F16H 49/001 74/411 |
| 2014/0232159 A1 * | 8/2014 | Villarroel | F16H 49/001 297/362 |

* cited by examiner

Primary Examiner — Ha D Ho
(74) Attorney, Agent, or Firm — Cantor Colburn LLP

(57) ABSTRACT

A harmonic drive is provided and includes a toothed harmonic ring gear, a harmonic wave generator including a rotor element, which includes an outer three-lobe wave profile, and a stator element configured to drive rotation of the rotor element. The harmonic drive further includes a harmonic flex spine radially interposed between the harmonic ring gear and the rotor element. The harmonic flex spine includes a toothed portion and a bearing element rotatably supportive of the rotor element within the toothed portion. The toothed portion is disposed to register with the toothed harmonic ring gear at three contact points defined by the outer three-lobe wave profile in accordance with the rotation of the rotor element.

13 Claims, 4 Drawing Sheets

THREE POINT HARMONIC DRIVE

BACKGROUND OF THE INVENTION

The subject matter disclosed herein relates to a three point harmonic drive and, more particularly, to a three point harmonic drive of an electric machine.

Harmonic drive gears are strain wave gears that can improve certain characteristics compared to traditional gearing systems. The advantages of harmonic drive gears include no backlash, compactness and light weight, high gear ratios, reconfigurable ratios within a standard housing, good resolution and excellent repeatability when repositioning inertial loads, high torque capability and coaxial input and output shafts. High gear reduction ratios are possible in a small volume (a ratio from 30:1 up to 320:1 is possible in the same space in which planetary gears typically only produce a 10:1 ratio). Harmonic drive gears are typically used in industrial motion control, machine tool, printing machine, robotics and aerospace for gear reduction but may also be used to increase rotational speed, or for differential gearing.

A typical harmonic drive contains a wave generator with a two point contact arrangement. Normally, this structure is provided to increase the gear ratio of the harmonic drive. However, two point arrangements are unstable radially and require additional bearings to support the radial alignment.

BRIEF DESCRIPTION OF THE INVENTION

According to one aspect of the invention, a harmonic drive is provided and includes a toothed harmonic ring gear, a harmonic wave generator including a rotor element, which includes an outer wave profile having at least three lobes, and a stator element configured to drive rotation of the rotor element, and a harmonic flex spine radially interposed between the harmonic ring gear and the rotor element and including a toothed portion and a bearing element rotatably supportive of the rotor element within the toothed portion. The toothed portion is disposed to register with the toothed harmonic ring gear at contact points corresponding to the lobes defined by the wave profile in accordance with the rotation of the rotor element.

In accordance with additional or alternative embodiments, the toothed harmonic ring gear and the toothed portion of the harmonic flex spine have dissimilar numbers of teeth.

In accordance with additional or alternative embodiments, the rotor element includes an annular base member including the outer wave profile and an annular array of permanent magnetic materials coupled to an inner diameter of the annular base member.

In accordance with additional or alternative embodiments, the stator element includes a hub, a plurality of spokes extending radially outwardly from the hub and conductive elements wound around the spoke to form windings.

In accordance with additional or alternative embodiments, the bearing element includes a roller bearing.

In accordance with additional or alternative embodiments, the harmonic flex spine further includes a flexible bearing race having inner and outer diameters, the inner diameter being disposed to contact with the bearing element, and the outer diameter being supportive of the toothed portion.

In accordance with additional or alternative embodiments, the harmonic flex spine includes spring steel and is sized such that deflection thereof is less than an elastic fatigue limit.

According to another aspect of the invention, a harmonic drive is provided and includes a harmonic ring gear including a first toothed portion disposed about a rotational axis, a harmonic wave generator disposed about the rotational axis and having central portion and outer portions, the outer portion including a rotor element, including an outer wave profile having at least three lobes extending radially outward, and the central portion including a stator element configured to drive rotation of the rotor element about the rotational axis and a harmonic flex spine radially interposed between the harmonic ring gear and the rotor element. The harmonic flex spine includes a second toothed portion and a bearing element rotatably supportive of the rotor element within the second toothed portion. The second toothed portion is disposed to register with the first toothed portion at contact points defined by the outer wave profile in accordance with the rotation of the rotor element.

In accordance with additional or alternative embodiments, the first and second toothed portions have dissimilar numbers of teeth.

In accordance with additional or alternative embodiments, the rotor element includes an annular base member including the wave profile and an annular array of permanent magnetic materials coupled to an inner diameter of the annular base member.

In accordance with additional or alternative embodiments, the stator element includes a hub, a plurality of spokes extending radially outwardly from the hub and conductive elements wound around the spoke to form windings.

In accordance with additional or alternative embodiments, the bearing element includes a roller bearing.

In accordance with additional or alternative embodiments, the harmonic flex spine further includes a flexible bearing race having inner and outer diameters, the inner diameter being disposed to contact with the bearing element, and the outer diameter being supportive of the second toothed portion.

In accordance with additional or alternative embodiments, the harmonic flex spine includes spring steel and is sized such that deflection thereof is less than an elastic fatigue limit.

According to yet another aspect of the invention, a harmonic drive system is provided and includes the harmonic drive described above and circuit elements by which current is applied to the stator element to power the driving of the rotation of the rotor element. The harmonic drive system is disposable at a coupling of a fixed aircraft structure and a flight control surface of an aircraft and is configured to control movement of the flight control surface relative to the fixed aircraft structure.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
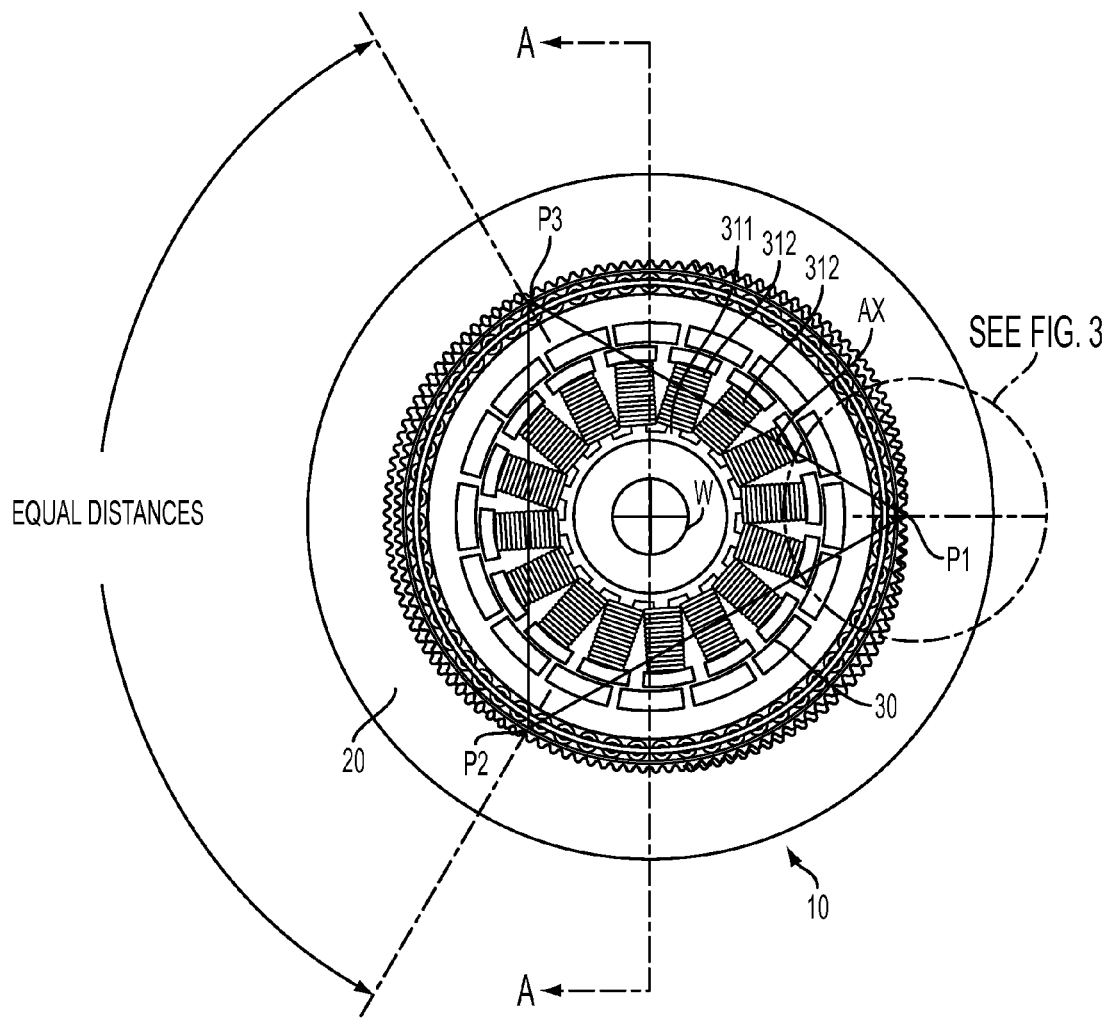
FIG. 1 is an axial view of a harmonic drive in accordance with embodiments.

The detailed description explains embodiments of the invention, together with advantages and features, by way of example with reference to the drawings.

DETAILED DESCRIPTION OF THE INVENTION

Harmonic drives often include a wave generator with a two-point contact arrangement to increase a gear ratio of the harmonic drive. This two-point contact arrangement is stable for monolithic wave generators, but when a wave generator is not monolithic having only two contact points can be radially unstable and require additional bearings to support radial alignment. Thus, as will be described below, a harmonic drive with a three-point contact arrangement has been developed that maintains radial stability with a less robust bearing support. This three-point harmonic drive could be applied anywhere a harmonic gear could be used and would be highly applicable where a high torque low speed actuator would be desired.

With reference to FIGS. 1-4, a three-point harmonic drive 10 is provided and includes a harmonic ring gear 20, a harmonic wave generator 30 and a harmonic flex spine 40. The harmonic ring gear 20 includes a first toothed portion 21 and disposed about a rotational axis W, with individual teeth 210 extending radially inward. The harmonic wave generator 30 is disposed about the rotational axis W and has a central radial portion 31 and an outer radial portion 32 that are separated from one another by a radial gap G. The outer radial portion 32 includes a rotor element 320 and the central radial portion includes a stator element 310. The stator element 310 is configured to drive rotation of the rotor element 320 about the rotational axis W thereby forming a configuration in which an electric motor is embedded within a harmonic drive.

The harmonic flex spine 40 is radially interposed between the harmonic ring gear 20 and the rotor element 320. The harmonic flex spine 40 may be formed of spring steel, for example, and is sized such that deflection of the harmonic flex spine 40 is less than the elastic fatigue limit of the harmonic flex spine 40 for an infinite number of deflections. The harmonic flex spine 40 includes a second toothed portion 41 with individual teeth 410 extending radially outward, a bearing element 42 and a flexible bearing race 43 having inner and outer diameters. The inner diameter of the flexible bearing race 43 is disposed to contact with the bearing element 42. The outer diameter of the flexible bearing race 43 is supportive of the second toothed portion 41.

The individual teeth 410 of the second toothed portion 41 are each disposed to register with the individual teeth 210 of the first toothed portion 21 at three uniformly distant contact points P1, P2 and P3 to define an equilateral triangle AX, which has a geometric center at the rotational axis W. In accordance with further embodiments, it will be understood that the individual teeth 410 of the second toothed portion 41 can be disposed to register with the individual teeth 210 of the first toothed portion 21 at more than three contact points.

In accordance with embodiments, the individual teeth 210 of the first toothed portion 21 and the individual teeth 410 of the second toothed portion 41 may be sized on the order of about 0.015-0.030 inches. Also, the individual teeth 210, 410 have a predefined depth such that the lobes that extend radially to define contact points P1, P2 and P3 are sized to cause the toothed portion 21 to engage the toothed portion 41.

The number of the individual teeth 410 of the second toothed portion 41 is less than the number of individual teeth 210 of the first toothed portion 21. This difference in the numbers of individual teeth 410, 210 defines a gear ratio of the harmonic drive 10 (i.e., the smaller the difference, the greater the gear ratio).

The bearing element 42 may be provided as a roller bearing 421 including an annular series of rollers attached to one another along a spine element. The bearing element 42 is configured to be rotatably supportive of the rotor element 320 within an interior region defined by the second toothed portion 41.

In accordance with embodiments, the rotor element 320 includes an annular base member 321, an annular array of permanent magnetic materials 322 that are respectively coupled to an inner diameter of the annular base member 321 and an outer three-lobe wave profile 323 extending radially outward from the annular base member 321 to define respective locations of the contact points P1, P2 and P3. In accordance with further embodiments, the stator element 310 includes a hub 311 that is formed to define an aperture through which a shaft or support element may extend, a plurality of spokes 312 extending radially outwardly from the hub 311 and conductive elements 313 that are wound around the spokes 312 to form windings.

Figure 4:
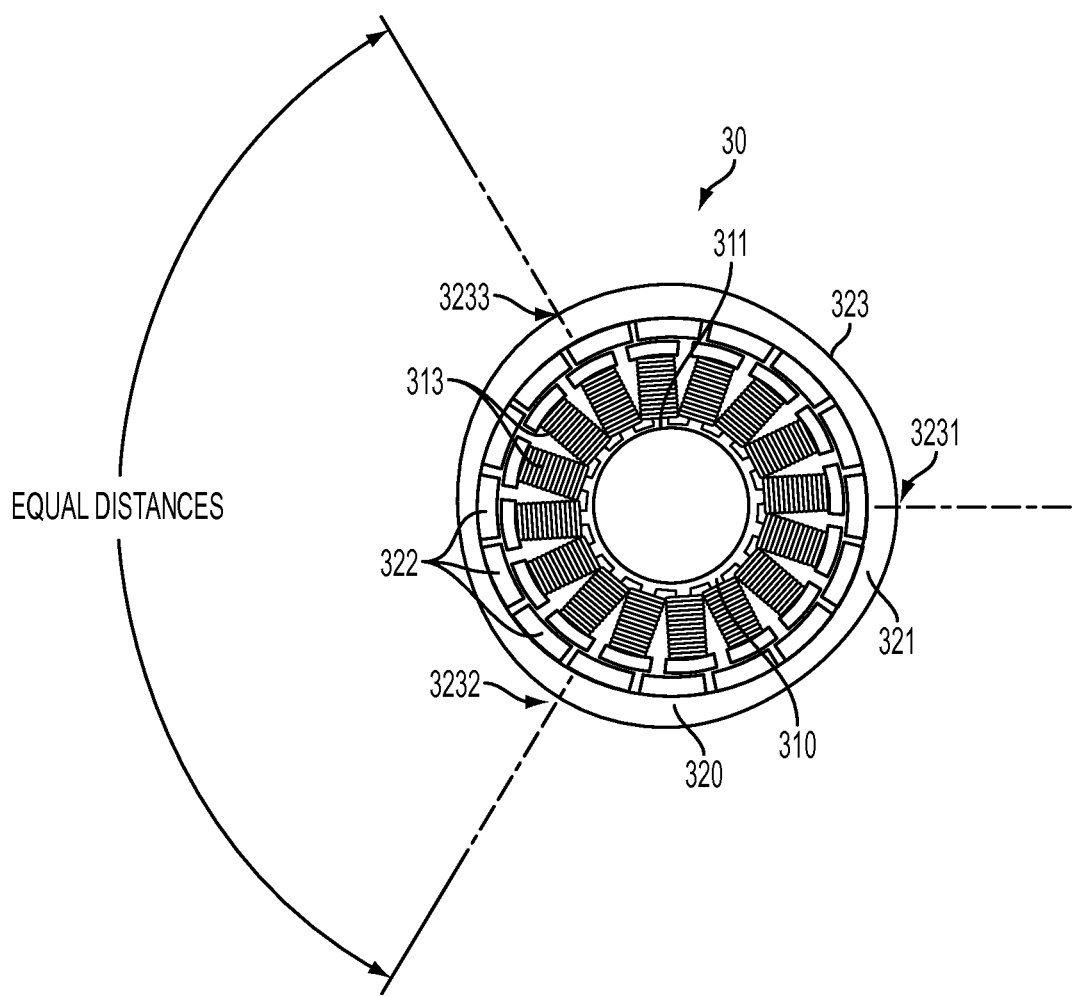
FIG. 4 is an axial view of stator and rotor elements of the harmonic drive of FIG. 1.

As shown in FIG. 4, the outer three-lobe wave profile 323 of the rotor element 320 includes a first convex portion (or lobe) 3231, a second convex portion (or lobe) 3232 and a third convex portion (or lobe) 3233. When the harmonic wave generator 30 is activated, current is applied to the conductive elements 313 such that a flux field is generated and this flux field interacts with the permanent magnetic materials 322 to cause the rotor element 320 to rotate about the rotational axis W in a first direction. During such rotation, the first, second and third convex portions 3231, 3232, 3233 push outwardly against the harmonic flex spine 40 and cause the harmonic flex spine 40 to deflect radially outward such that the local individual teeth 410 register with the local individual teeth 210 to form the first, second and third contact points P1, P2 and P3, respectively. This, in turn, causes the harmonic ring gear 20 to rotate about the rotational axis W in a second direction, which is opposite the first direction. Continued rotation of the rotor element 320 in the first direction thus results in continued rotation of the harmonic ring gear 20 in the second direction with the difference in the numbers of the individual teeth 410, 210 defining a difference in relative rotational speeds of the rotor element 320 and the harmonic ring gear 20.

Figure 2:
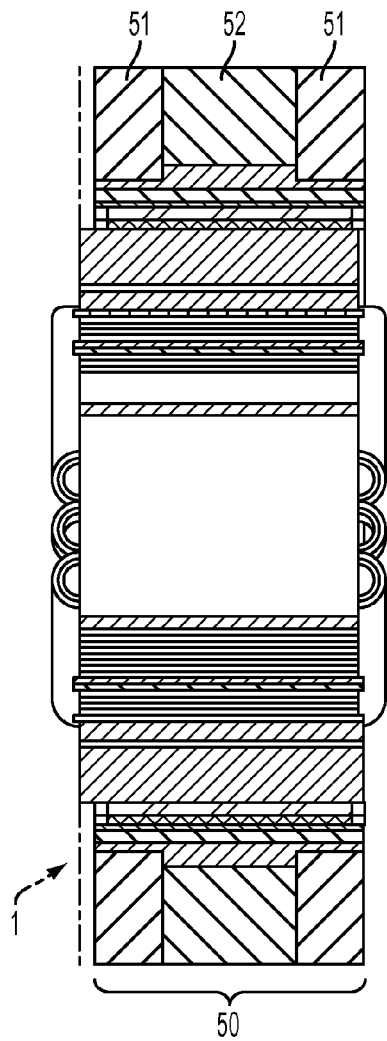
FIG. 2 is a side view of the harmonic drive of FIG. 1 taken along line A-A.
Figure 3:
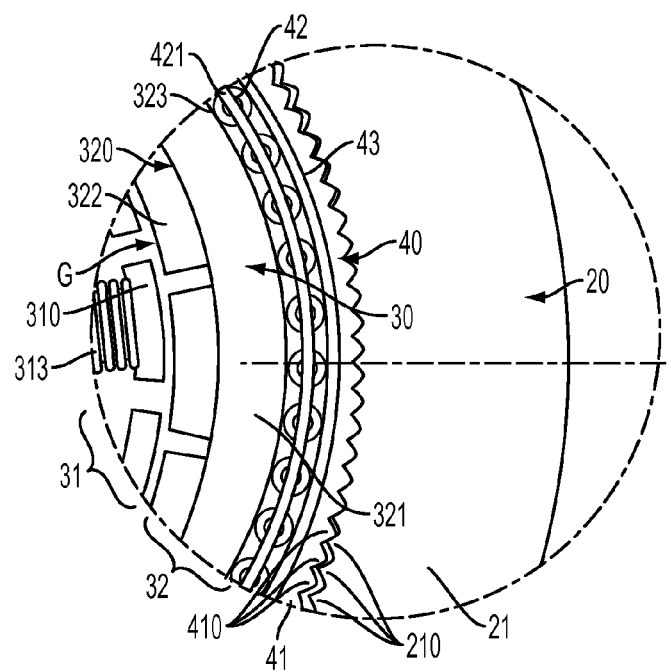
FIG. 3 is an enlarged axial view of the encircled portion of the harmonic drive of FIG. 1 in accordance with embodiments.

As shown in FIG. 2 and in a harmonic drive system 1, circuit elements 50 may be coupled to the stator element 310. The circuit elements 50 may include ground elements 51 and output elements 52 by which current may be applied to the conductive elements 312 of the stator element 310 to power the driving of the rotation of the rotor element 320.

Figure 5:
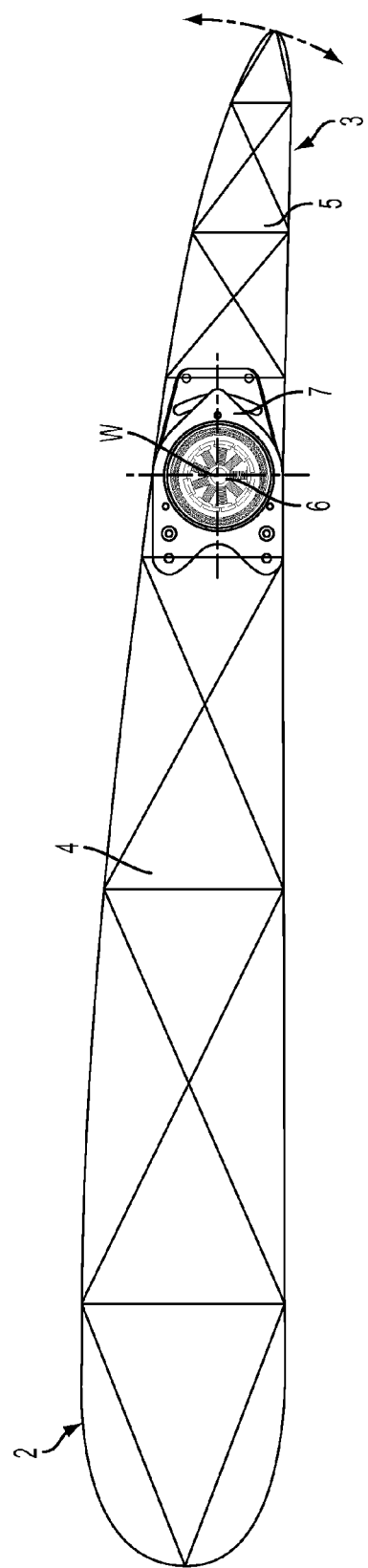
FIG. 5 is a side view of an airfoil structure in which the harmonic drive of FIG. 1 is disposable.

With reference to FIG. 5, the harmonic drive system 1 of FIG. 2 may be operably disposed in a flight control system of an aircraft or a rotorcraft. That is, in a case in which an aircraft includes a fixed aircraft structure, such as a wing 2 and a movable flight control surface such as an aileron 3, the three-point harmonic drive 10 of the harmonic drive system 1 may be disposed at a coupling of the wing 2 and the aileron 3 and may be configured to control a pivoting of the aileron 3 relative to the wing 2. As shown in FIGS. 1 and 5, the wing 2 includes a wing spar 4 to which a ground arm 6 of the stator element 310 of the three-point harmonic drive 10 is connected and the aileron 3 includes an aileron spar 5, which is connected to an output arm 7 of the harmonic ring gear 20 of the three-point harmonic drive 10. The wing 2 may further include bearings disposed to maintain an axial position of the three-point harmonic drive 10. More particularly, the wing 2 may include bearings disposed to maintain relative axial positions of the harmonic ring gear 20, the harmonic wave generator 30 and the harmonic flex spine 40.

With the aileron 3 in a zero-pivot condition, respective upper and lower surfaces of the wing spar 4 and the aileron spar 5 are aligned. However, when the harmonic wave generator 30 is activated, the rotor element 320 may be driven in one of two pivoting directions. This driving of the rotor element 320 causes the harmonic ring gear 20 to rotate about the rotational axis W and, in turn, the rotation of the harmonic ring gear 20 is transmitted to the aileron spar 5 via the output arm 7 to thereby cause the aileron spar 5 to pivot about the aileron pivot axis. In accordance with embodiments, the aileron pivot axis may be defined coaxially with the rotational axis W. The pivoting of the aileron spar 5 can be in positive or negative directions in accordance with flight conditions of the associated aircraft. It should be understood that other flight control surfaces, such as elevators, rudders, slats, spoilers, etc., can be controlled using the harmonic drive system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A harmonic drive, comprising:
   a toothed harmonic ring gear;
   a harmonic wave generator comprising a rotor element, including an outer wave profile having at least three lobes, and a stator element configured to drive rotation of the rotor element, wherein the rotor element comprises:
      an annular base member including the wave profile; and
      an annular array of permanent magnetic materials coupled to an inner diameter of the annular base member; and
   a harmonic flex spine radially interposed between the harmonic ring gear and the rotor element and comprising a toothed portion and a bearing element rotatably supportive of the rotor element within the toothed portion,
   the toothed portion being disposed to register with the toothed harmonic ring gear at contact points corresponding to said lobes defined by the wave profile in accordance with the rotation of the rotor element.

2. The harmonic drive according to claim 1, wherein the toothed harmonic ring gear and the toothed portion of the harmonic flex spine have dissimilar numbers of teeth.

3. The harmonic drive according to claim 1, wherein the stator element comprises:
   a hub;
   a plurality of spokes extending radially outwardly from the hub; and
   conductive elements wound around the spoke to form windings.

4. The harmonic drive according to claim 1, wherein the bearing element comprises a roller bearing.

5. The harmonic drive according to claim 1, wherein the harmonic flex spine further comprises a flexible bearing race having inner and outer diameters,
   the inner diameter being disposed to contact with the bearing element, and
   the outer diameter being supportive of the toothed portion.

6. The harmonic drive according to claim 1, wherein the harmonic flex spine comprises spring steel and is sized such that deflection thereof is less than an elastic fatigue limit.

7. A harmonic drive, comprising:
   a harmonic ring gear including a first toothed portion disposed about a rotational axis;
   a harmonic wave generator disposed about the rotational axis and having central portion and outer portions, the outer portion comprising a rotor element, including an outer wave profile having at least three lobes extending radially outward, and the central portion comprising a stator element configured to drive rotation of the rotor element about the rotational axis; and
   a harmonic flex spine radially interposed between the harmonic ring gear and the rotor element and comprising:
   a second toothed portion; and
   a bearing element rotatably supportive of the rotor element within the second toothed portion,
   the second toothed portion being disposed to register with the first toothed portion at contact points defined by the outer wave profile in accordance with the rotation of the rotor element;
   wherein the rotor element comprises:
   an annular base member including the outer wave profile; and
   an annular array of permanent magnetic materials coupled to an inner diameter of the annular base member.

8. The harmonic drive according to claim 7, wherein the first and second toothed portions have dissimilar numbers of teeth.

9. The harmonic drive according to claim 7, wherein the stator element comprises:
   a hub;
   a plurality of spokes extending radially outwardly from the hub; and
   conductive elements wound around the spoke to form windings.

10. The harmonic drive according to claim 7, wherein the bearing element comprises a roller bearing.

11. The harmonic drive according to claim 7, wherein the harmonic flex spine further comprises a flexible bearing race having inner and outer diameters,
    the inner diameter being disposed to contact with the bearing element, and
    the outer diameter being supportive of the second toothed portion.

12. The harmonic drive according to claim 7, wherein the harmonic flex spine comprises spring steel and is sized such that deflection thereof is less than an elastic fatigue limit.

13. A harmonic drive system, comprising the harmonic drive according to claim 7 and circuit elements by which current is applied to the stator element to power the driving of the rotation of the rotor element,
    the harmonic drive system being disposable at a coupling of a fixed aircraft structure and a flight control surface of an aircraft and being configured to control movement of the flight control surface relative to the fixed aircraft structure.

* * * * *